United States Patent
Yamasaki

(10) Patent No.: US 9,045,220 B2
(45) Date of Patent: Jun. 2, 2015

(54) CONTROL SYSTEM OF AIRCRAFT, METHOD FOR CONTROLLING AIRCRAFT, AND AIRCRAFT

(75) Inventor: Koichi Yamasaki, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 13/517,132

(22) PCT Filed: Feb. 25, 2011

(86) PCT No.: PCT/JP2011/054253
§ 371 (c)(1),
(2), (4) Date: Jul. 31, 2012

(87) PCT Pub. No.: WO2011/105536
PCT Pub. Date: Sep. 1, 2011

(65) Prior Publication Data
US 2012/0298806 A1    Nov. 29, 2012

(30) Foreign Application Priority Data
Feb. 26, 2010 (JP) .................................. 2010-043521

(51) Int. Cl.
*B64C 13/16* (2006.01)
*B64D 31/06* (2006.01)

(52) U.S. Cl.
CPC ................ *B64C 13/16* (2013.01); *B64D 31/06* (2013.01)

(58) Field of Classification Search
CPC ...... B64C 13/16; B64C 13/18; G05D 1/0638; G05D 1/063; G05D 1/0623; G05D 1/085; G05D 1/0816; G05D 1/0833; B64D 31/06
USPC .................................. 244/195, 188, 227, 228
See application file for complete search history.

(56) References Cited

U.S. PATENT DOCUMENTS 4,536,843 A * 8/1985 Lambregts ..................... 244/181
5,127,608 A * 7/1992 Farineau et al. ............... 244/195
(Continued)

FOREIGN PATENT DOCUMENTS

CN    1175017      3/1998
CN    100501624    6/2009
(Continued)

OTHER PUBLICATIONS

Frank W. Burcham, Jr. et al., "Manual Manipulation of Engine Throttles for Emergency Flight Control", NASA/TM-2004-212045, Jan. 1, 2004, pp. 1-69.
(Continued)

*Primary Examiner* — Rob Swiatek
*Assistant Examiner* — Richard R Green
(74) *Attorney, Agent, or Firm* — Wenderoth, Lind & Ponack, L.L.P.

(57) ABSTRACT

Stable flight can be achieved without the need for a complicated throttle operation by a pilot even when part or all of control surfaces malfunction. A computer (15) calculates a thrust control signal for controlling engine thrust and a deflection angle control signal for controlling control surfaces based on state information regarding an airframe and an operation command signal from an operation end. An engine control unit (17) drives an engine based on the thrust control signal. An actuator (16) moves the control surfaces based on the deflection angle control signal.

4 Claims, 1 Drawing Sheet

(56) References Cited

U.S. PATENT DOCUMENTS

| | | | |
|---|---|---|---|
| 5,330,131 A | | 7/1994 | Burcham et al. |
| 5,337,982 A | * | 8/1994 | Sherry .................. 244/195 |
| 6,041,273 A | | 3/2000 | Burken et al. |
| 6,102,330 A | | 8/2000 | Burken et al. |
| 6,622,972 B2 | * | 9/2003 | Urnes et al. ................. 244/195 |
| 7,305,285 B2 | * | 12/2007 | Villaume et al. ............... 701/3 |
| 2003/0080256 A1 | | 5/2003 | Urnes, Sr. et al. |
| 2011/0313599 A1 | | 12/2011 | Beaufrere |

FOREIGN PATENT DOCUMENTS

| | | |
|---|---|---|
| DE | 36 09 457 | 9/1986 |
| FR | 2 474 439 | 7/1981 |
| JP | 5-97095 | 4/1993 |
| JP | 8-183497 | 7/1996 |
| JP | 2003-291893 | 10/2003 |
| RU | 2 122 511 | 11/1998 |
| RU | 2 194 886 | 4/2002 |
| RU | 2 235 043 | 8/2004 |
| RU | 2 237 276 | 9/2004 |

OTHER PUBLICATIONS

F. W. Burcham, Jr. et al., "Flight Testing a Propulsion-Controlled Aircraft Emergency Flight Control System on an F-15 Airplane", NASA Technical Memorandum 4590, Jun. 1, 1994, pp. 1-17.

International Search Report issued Apr. 26, 2011 in corresponding International Application No. PCT/JP2011/054253.

Office Action issued Apr. 19, 2011 in Japanese Application No. 2010-043521 (with English translation).

Office Action issued Sep. 27, 2011 in Japanese Application No. 2010-043521 (with English translation).

Hideaki Yamane et al., "A Study on Aircraft Engine Control Systems for Integrated Flight and Propulsion Control, Part 2: Integrated Flight and Propulsion Control", Journal of the Japan Society for Aeronautical and Space Sciences, Jul. 2008, vol. 56, No. 654, pp. 299-307 (with English abstract).

John Bull et al., "Piloted Simulation Tests of Propulsion Control as Backup to Loss of Primary Flight Controls for a B747-400 Jet Transport", NASA Technical Memorandum 112191, Apr. 1997, pp. 1-43.

Office Action issued Jan. 30, 2014 in corresponding Chinese patent application No. 201180005174.1 with English translation.

Office Action issued Oct. 30, 2013 in Russian Patent Application No. 2012125844 with English translation.

Decision to Grant a Patent issued on Jul. 7, 2014 in corresponding Russian patent application No. 2012125844 (with English translation).

Notice of Allowance issued Jun. 13, 2014 in corresponding Canadian patent application No. 2785692.

Notice of Allowance issued Mar. 18, 2015 in corresponding Chinese patent application No. 201180005174.1.

* cited by examiner

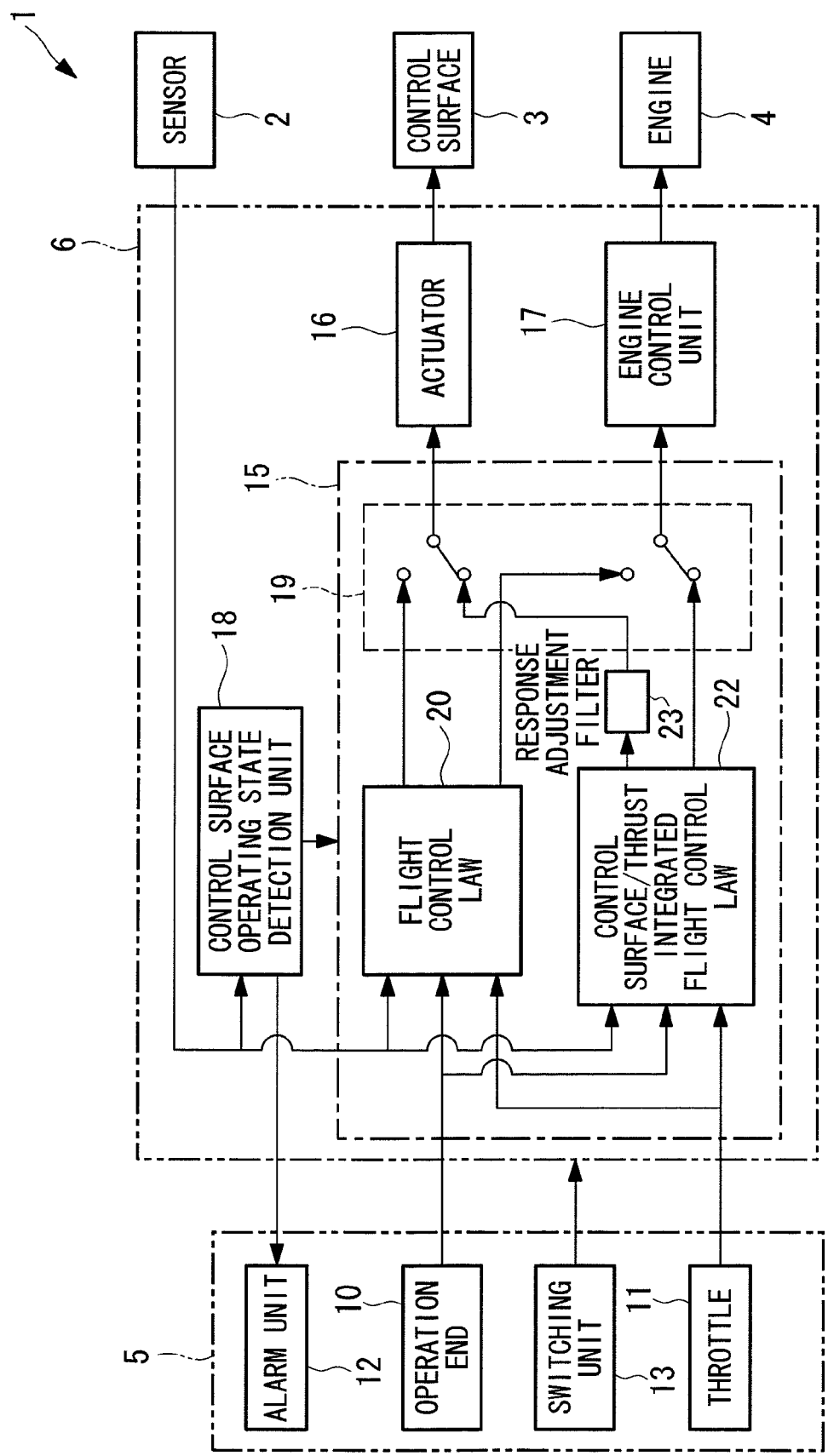

CONTROL SYSTEM OF AIRCRAFT, METHOD FOR CONTROLLING AIRCRAFT, AND AIRCRAFT

BACKGROUND OF THE INVENTION

1. Technical Field

The present invention relates to an aircraft control system, a method for controlling an aircraft, and an aircraft, and particularly relates to an aircraft control system, a method for controlling an aircraft, and an aircraft that enable stable flight even when part or all of control surfaces are in a malfunctioning state, for example, an inoperative state or a damaged state.

2. Description of the Related Art

Generally, the attitude of aircraft is controlled by an actuator appropriately moving control surfaces such as elevators, ailerons, and a rudder in accordance with a predetermined control signal. More specifically, in aircraft control systems, a controlling computer mounted on an aircraft calculates a deflection angle control signal for controlling control surfaces based on information detected from various sensors such as an inertial sensor and an air data sensor provided on the aircraft and an operation command signal from a vehicle control unit such as a control wheel. The actuator then moves the control surfaces in accordance with the deflection angle control signal calculated by the controlling computer, thereby maintaining the aircraft in a desired attitude and achieving stable flight.

However, once a failure, damage, or the like occurs during a flight and causes part or all of the control surfaces to malfunction, it is difficult to change or maintain the attitude using the control surfaces. To compensate for this problem, a pilot will operate a throttle to keep a desired attitude and try to continue the flight or make a landing.

With regard to aircraft control in the case where there is damage to the control surfaces, for example, Japanese Unexamined Patent Application, Publication No. Hei 8-183497 discloses a control method in which a thrust vectoring means that generates a moment in the yaw direction by deflecting jet exhaust is provided, and control by a rudder is switched to control by the thrust vectoring means if it is judged that the rudder does not function normally.

SUMMARY OF THE INVENTION

1. Technical Problem

However, the above-described aircraft control by the pilot operating the throttle has a problem that it is difficult to continue stable flight or make a safe landing. The technology disclosed in Patent Literature 1 has problems of an increase in the number of aircraft components, an increase in weight, and an increase in the number of portions that require maintenance because it is necessary to separately provide the thrust vectoring means.

The present invention has been made to solve the above-described problems, and it is an object thereof to provide an aircraft control system that enables stable flight without the need for a complicated throttle operation by the pilot even when part or all of control surfaces malfunction.

2. Solution to the Problem

In order to solve the problems, the present invention employs the following solutions.

The present invention provides an aircraft control system including a computation unit that calculates a thrust control signal for controlling engine thrust and a deflection angle control signal for controlling control surfaces based on state information indicating a state of an airframe and an operation command signal from a vehicle control unit, an engine driving unit that drives an engine based on the thrust control signal, and a control surface moving unit that moves the control surfaces based on the deflection angle control signal.

According to the present invention, the computation unit acquires various types of state information regarding the state of the airframe, such as the angular speed, the attitude angle, the acceleration, the angle of attack, the angle of sideslip, the pressure altitude, and the airspeed of the airframe, from an inertial sensor, an air data sensor, and the like that are provided on the airframe, and also acquires an operation command signal generated by the pilot operating the vehicle control unit such as a control wheel. Then, to control the airframe to keep it in a desired attitude, the computation unit calculates a thrust control signal for controlling engine thrust and a deflection angle control signal for controlling the control surfaces based on the state information and the operation command signal. Furthermore, the engine driving unit drives the engine based on the thrust control signal, and the control surface moving unit moves the control surfaces based the deflection angle control signal. In this manner, in addition to control of the deflection angle that is performed by moving the control surfaces, control of engine thrust is performed by driving the engine based on the thrust control signal. Thus, even when part or all of the control surfaces become inoperative or damaged and the control surfaces do not function normally, that is, when it is difficult to control the airframe attitude using the control surfaces, the airframe can be changed to or maintained in a desired attitude by controlling the engine thrust, and stable flight can be continued without the need for a complicated throttle operation by the pilot.

An aircraft control system according to a first aspect of the present invention includes a control surface failure/damage detection unit that detects that at least one of the control surfaces malfunctions, wherein the computation unit calculates the thrust control signal and the deflection angle control signal if it is detected that at least one of the control surfaces malfunctions.

According to the first aspect of the present invention, the airframe is controlled by means of the engine thrust if there is a malfunction in the control surfaces, and therefore, stable flight can be continued at all times. Generally, when an airframe is controlled by means of engine thrust, the response speed is less than that when the airframe is controlled by means of the control surfaces. Moreover, if all of the control surfaces function normally, there is no need to control engine thrust to maintain the attitude of the airframe. For this reason, the airframe is controlled by means of engine thrust only when part or all of the control surfaces malfunction, and thus, the airframe can be more accurately controlled and stable flight can be continued at all times.

An aircraft control system according to a second aspect of the present invention includes an alarm unit that detects that at least one of the control surfaces malfunctions and informs a pilot to that effect.

According to the second aspect of the present invention, since the pilot is informed of the fact that at least one of the control surfaces malfunctions, the pilot can be expected to take an appropriate action, and therefore, the airframe can be more accurately controlled and stable flight can be continued.

An aircraft control system according to a third aspect of the present invention includes a response adjustment filter that adjusts response speed of the engine and the control surfaces.

According to the third aspect of the present invention, the speed of the response of the airframe when controlled by means of the engine thrust and the response of the airframe when controlled by means of the control surfaces can be adjusted by the response adjustment filter, and this can contribute to continuation of stable flight. Generally, the response speed of the airframe when controlled by means of engine thrust is slower than the response speed of the airframe when controlled by means of the deflection angle. Moreover, the response speed varies depending on which portion of the control surfaces malfunctions. For this reason, the deflection angle control signal is filtered by the response adjustment filter to make the response speed of the control surfaces almost equal to the response speed of the engine. Thus, the variation in the response speed can be suppressed, and this can contribute to continuation of stable flight.

The present invention provides an aircraft including the above-described aircraft control system.

According to the present invention, since the aircraft includes the above-described control system, the airframe can be changed to or maintained in a desired attitude by performing control of engine thrust by driving the engine based on the thrust control signal, in addition to control of the deflection angle that is performed by moving the control surfaces, and therefore, stable flight can be continued without the need for a complicated throttle operation by the pilot.

The present invention provides a method for controlling an aircraft, the method including the steps of calculating a thrust control signal for controlling engine thrust and a deflection angle control signal for controlling control surfaces based on state information indicating the state of an airframe of an aircraft and an operation command signal from a vehicle control unit, driving an engine based on the thrust control signal, and moving the control surfaces based on the deflection angle control signal.

3. Advantageous Effects of Invention

As described above, according to the present invention, stable flight can be achieved without the need for a complicated throttle operation by the pilot even when part or all of the control surfaces malfunction.

BRIEF DESCRIPTION OF THE DRAWINGS

FIG. 1 is a block diagram schematically showing the configuration of an aircraft control system according to an embodiment of the present invention in a state in which the control system is applied to an aircraft.

DETAILED DESCRIPTION OF THE INVENTION

Hereinafter, an aircraft control system according to an embodiment of the present invention will be described with reference to the drawing.

FIG. 1 is a block diagram schematically showing the configuration of an aircraft 1 to which the aircraft control system according to the present embodiment is applied. The aircraft 1 includes a sensor 2, control surfaces 3, an engine 4, a cockpit 5, and a control system 6.

The sensor 2 includes various sensors such as an inertial sensor and an air data sensor, and acquires various types of state information regarding the state of an airframe, such as the angular speed, the attitude angle, the acceleration, the angle of attack, the angle of sideslip, the pressure altitude, and the airspeed of the airframe, and outputs the acquired state information to the control system 6.

The control surfaces 3 include an elevator that moves the nose of the aircraft up or down, a rudder that changes the direction that the nose of the aircraft is pointing to left or right, an aileron that banks the airframe left or right, and a high-lift device (flap) that rectifies the airfoil of a main wing to increase lift. An actuator, which will be described later, moves the control surfaces 3, and thus, the attitude of the airframe is controlled by means of an aerodynamic force.

The engine 4, which may be a jet engine, is driven by an engine control unit, which will be described later, to produce thrust as a reaction to a high-speed discharge of gases generated by burning fuel with air drawn therein.

In the cockpit 5, instruments (not shown) that indicate the flight conditions of the aircraft 1 are disposed, and as shown in FIG. 1, various types of equipment for enabling the pilot to control the aircraft 1, such as a vehicle control unit 10, a throttle 11, a alarm unit 12, and a switching unit 13, are disposed. The pilot operates the vehicle control unit 10 to control the control surfaces 3, and an operation command signal for controlling the control surfaces that is generated by the pilot operating the vehicle control unit 10 is output to the control system 6. The pilot operates the throttle 11 to control engine thrust, and an operation command signal for controlling engine thrust that is generated by the pilot operating the throttle 11 is output to the control system 6. The alarm unit 12 makes a buzzing sound or performs a display on a display unit (not shown) provided within the cockpit 5 to inform the pilot of a predetermined warning based on information from the control system 6. In the present embodiment, especially when there is a malfunction in the control surfaces 3, for example, when a control surface is damaged, the alarm unit 12 informs the pilot to that effect. The switching unit 13 outputs a switching command signal for switching a flight control law 20 and a control surface/thrust integrated flight control law 22 (described in detail later) of the control system 6, and the switching command signal is output to the control system 6 based on an operation by the pilot.

The control system 6 includes a computer 15 for computing a predetermined control signal, an actuator 16 that moves the control surfaces 3 based on the control signal output from the computer 15, an engine control unit 17 that similarly drives the engine 4 based on the control signal output from the computer 15, and a control surface failure/damage detection unit 18 that detects a failure/damage of the control surfaces.

The computer 15 computes a deflection angle control signal and a thrust control signal, and includes the flight control law 20, the control surface/thrust integrated flight control law 22, and a switch 19 for switching between these two laws.

The flight control law 20 is a flight control law for enabling the aircraft 1 to be flown automatically or manually by the pilot in a state in which the aircraft 1 is flying normally with its equipment such as the control surfaces 3 functioning normally.

In a state in which the aircraft 1 is controlled based on the flight control law 20, to control especially the attitude of the aircraft 1, the computer 15 generates a deflection angle control signal based on the operation command signal from the pilot via the vehicle control unit 10 and the state information from the sensor 2. Every generated deflection angle control signal is output to the actuator 16, and the actuator 16 moves the control surfaces 3 in accordance with the deflection angle control signal to control the deflection angle, thereby changing or maintaining the attitude of the aircraft 1.

The control surface/thrust integrated flight control law 22 is a flight control law for enabling the aircraft 1 to be flown automatically or manually by the pilot when any of the control surfaces 3 of the aircraft 1 malfunctions. In a state in which the aircraft 1 is controlled based on the control surface/thrust integrated flight control law 22, to control the attitude of the aircraft 1, the computer 15 generates a deflection angle control signal and a thrust control signal based on the operation command signal from the pilot via the vehicle control unit 10 and the state information from the sensor 2. According to the control surface/thrust integrated flight control law 22, since the thrust control signal is computed based on the operation command signal and the state information, even when the throttle 11 is operated, the computer 15 restricts the effect of this operation and automatically puts high priority on computation of the thrust control signal based on the operation command signal and the state information.

The generated deflection angle control signal is output to the actuator 16, and the actuator 16 moves the control surfaces 3 in accordance with the deflection angle control signal. The generated thrust control signal is output to the engine control unit 17, and the engine control unit 17 drives the engine 4 in accordance with the thrust control signal. As a result of the control surfaces 3 being moved in accordance with the deflection angle control signal and the engine 4 being driven in accordance with the thrust control signal, the deflection angle and the engine thrust are controlled, and the attitude of the aircraft 1 is changed or maintained accordingly.

It should be noted that a response adjustment filter 23 for adjusting the difference in response speed between the engine 4 and the control surfaces 3 is provided on a path over which the deflection angle control signal is output from the control surface/thrust integrated flight control law 22 to the actuator 16. The response adjustment filter 23 can perform response speed adjustment by, for example, filtering the deflection angle control signal.

Generally, the response speed from when a thrust control signal is output to control engine thrust until when the engine 4 outputs engine thrust based on that thrust control signal is slower than the response speed from when a deflection angle control signal is output to control the deflection angle until when the control surfaces 3 reach a deflection angle based on that deflection angle control signal. Moreover, the response speed of the airframe varies depending on which portion of the control surfaces 3 malfunctions. For this reason, the response adjustment filter 23 is provided to perform adjustment so as to make the response speed of the control surfaces 3 almost equal to the response speed of the engine 4, thereby achieving a uniform response speed of the airframe regardless of which portion of the control surfaces 3 malfunctions.

The control surface failure/damage detection unit 18 judges whether the control surfaces 3 function normally based on the state information regarding the aircraft 1 output from the sensor 2, detects a malfunction if any or all of the control surfaces 3 are inoperative or damaged, and outputs a malfunction signal to that effect to the alarm unit 12 and the computer 15. Moreover, the control surface failure/damage detection unit 18 outputs a switching signal to the computer 15 when the flight control law 20 and the control surface/thrust integrated flight control law 22 of the computer 15 are to be automatically switched in a state in which the malfunction of the control surfaces 3 has been detected.

The switch 19 is adapted to switch between the flight control law 20 and the control surface/thrust integrated flight control law 22 as appropriate in response to either the switching command signal from the switching unit 13 based on an instruction from the pilot or the switching signal from the control surface failure/damage detection unit 18, depending on the state of the aircraft 1.

Hereinafter, effects of the thus configured aircraft control system will be described.

When there is no abnormality in the equipment such as the control surfaces 3 of the above-described aircraft 1, the aircraft 1 flies under control based on the flight control law 20. During the flight, if the control surface failure/damage detection unit 18 detects that at least one of the control surfaces 3 malfunctions for some reason such as damage, the control surface failure/damage detection unit 18 outputs a malfunction signal to that effect to the alarm unit 12 and a switching signal to the computer 15. Once the pilot of the aircraft 1 recognizes the malfunction of the control surfaces 3 as a result of the malfunction signal being output to the alarm unit 12, the pilot operates the switching unit 13 to switch to the control surface/thrust integrated flight control law 22, and the switching unit 13 outputs a switching command signal. The computer 15 drives the switch 19 based on the switching command signal to switch the flight control law so that the aircraft 1 is controlled based on the control surface/thrust integrated flight control law 22 as shown in FIG. 1.

In a state in which the aircraft 1 is controlled based on the control surface/thrust integrated flight control law 22, if an operation command signal is output to the computer 15 from the vehicle control unit 10, the computer 15, based on the operation command signal and the state information from the sensor 2, considers which of the control surfaces 3 malfunctions and computes a deflection angle control signal and a thrust control signal so as to change or maintain the airframe to or in a desired attitude while compensating for the malfunctioning control surface 3. Then, the actuator 16 moves the control surfaces 3 based on the computed deflection angle control signal, and the engine control unit 17 drives the engine based on the thrust control signal. As a result, the airframe is changed to or maintained in the desired attitude.

For example, when it is desired to roll the airframe to the left, if all of the control surfaces 3 function normally, a trailing edge of an aileron on the port side is turned upward to decrease the lift on a main wing on the port side and a trailing edge of an aileron on the starboard side is turned downward to increase the lift on a main wing on the starboard side, thereby generating a difference in lift between the left and right sides of the airframe. However, if there is a malfunction in the aileron on the starboard side, a sufficient difference in lift as described above cannot be generated, and therefore, the airframe cannot be rolled (rotated) to the left at a desired speed.

To address this issue, the computer 15, based on the control surface/thrust integrated flight control law 22, generates a deflection angle control signal that turns the trailing edge of the aileron on the port side upward and computes a thrust control signal that decreases engine thrust of an engine on the port side while increasing engine thrust of an engine on the starboard side. As a result of the control surfaces 3 and the engine 4 being moved or driven in accordance with these control signals, the lift on the main wing on the port side is decreased and a yawing moment for left yaw is generated to produce an angle of sideslip, and a rolling moment due to a dihedral effect is generated, and thus, the airframe can be rolled to the left at the desired speed.

As another example, when it is desired to lower the nose, if all of the control surfaces 3 function normally, it is possible to easily lower the nose by moving elevators, while if there is a malfunction in the elevators, the computer 15 generates a thrust control signal that decreases engine thrust of the left and right engines at the same time. This enables control in the pitch direction to be performed by means of the engines, and thus, the nose can be lowered.

Since, as described above, control of engine thrust is also performed in addition to control of the deflection angle that is performed by moving the control surfaces 3, even when part or all of the control surfaces 3 malfunction and the control surfaces 3 do not function normally, that is, when it is difficult to control the airframe attitude using the control surfaces, this problem is compensated for by computing a thrust control signal for controlling the engine thrust automatically and thereby controlling the engine thrust. Thus, even when part or all of the control surfaces 3 malfunction and the control surfaces 3 do not function normally, the airframe can be changed to or maintained in a desired attitude without the need for a complicated throttle operation by the pilot, and stable flight can therefore be continued.

It should be noted that although the computer 15 can of course perform switching between the flight control law 20 and the control surface/thrust integrated flight control law 22 via the switch 19 by software, it may include separate and independent computing devices that compute a deflection angle control signal and a thrust control signal, respectively, and perform switching between the flight control law 20 and the control surface/thrust integrated flight control law 22 via the switch 19 by hardware.

The invention claimed is:

1. An aircraft control system comprising:
   a computation unit that computes a thrust control signal for controlling engine thrust and a deflection angle control signal for controlling control surfaces based on state information indicating a state of an airframe and an operation command signal from a vehicle control unit;
   an engine driving unit that drives an engine based on the thrust control signal;
   a control surface moving unit that moves the control surfaces based on the deflection angle control signal;
   a response adjustment filter that filters the deflection angle control signal to make a response speed of the airframe in response to deflection of the control surfaces almost equal to a response speed of the airframe in response to a change in thrust of the engine responsive to the detection of a control surface malfunction;
   a control surface failure/damage detection unit that detects that at least one of the control surfaces malfunctions; and
   wherein the computation unit calculates the thrust control signal and the deflection angle control signal if it is detected that at least one of the control surfaces malfunctions.

2. The aircraft control system according to claim 1, comprising an alarm unit that detects that at least one of the control surfaces malfunctions and informs a pilot of the detected result.

3. An aircraft comprising the aircraft control system according to claim 1.

4. A method for controlling an aircraft, the method comprising the steps of:
   calculating a thrust control signal for controlling engine thrust and a deflection angle control signal for controlling control surfaces based on state information indicating a state of an airframe and an operation command signal from a vehicle control unit if it is detected that at least one of the control surfaces malfunctions;
   driving an engine based on the thrust control signal; moving the control surfaces based on the deflection angle control signal; and
   filtering the deflection angle control signal to make—a response speed of the airframe in response to deflection of the control surfaces—almost equal to the response speed of the—airframe in response to a change in thrust of the—engine—responsive to the detection of a control surface malfunction.

* * * * *